Feb. 9, 1971 B. KAZAN 3,561,958
INDUCING FROST DEFORMATION IMAGING BY ELECTROLYTIC DEPOSITION
Filed April 7, 1967

INVENTOR.
BENJAMIN KAZAN
BY
ATTORNEYS

United States Patent Office 3,561,958
Patented Feb. 9, 1971

3,561,958
INDUCING FROST DEFORMATION IMAGING BY ELECTROLYTIC DEPOSITION
Benjamin Kazan, Pasadena, Calif., assignor to Xerox Corporation, Rochester, N.Y., a corporation of New York
Filed Apr. 7, 1967, Ser. No. 629,218
Int. Cl. G03g 5/00
U.S. Cl. 96—1.1      3 Claims

ABSTRACT OF THE DISCLOSURE

This invention relates to recording information and, in particular, to deformation imaging. The imaging method comprises contacting a photoconductive heat-deformable thermoplastic layer with an electrolyte containing an electrolytically reducible material, exposing the photoconductive thermoplastic layer to sensitizing radiation whereby minute quantities of the reducible material are deposited in imagewise configuration on portions of the photoconductive thermoplastic layer adjacent the electrolyte, uniformly charging the exposed surface of the photoconductive thermoplastic layer and softening the layer until it deforms in imagewise configuration according to the deposited pattern.

BACKGROUND OF THE INVENTION

This invention relates to recording information and, more particularly, to recording on heat-deformable materials.

It is known to record on deformable dielectric material by a process known as "frosting" which is described in Gunther et al. U.S. No. 3,196,011. The frost process is also discussed in detail in a publication entitled "A Cyclic Xerographic Method Based on Frost Deformation" by R. W. Gundlach and C. J. Claus, Journal of Photographic Science and Engineering, Vol. 7, No. 1, pp. 14–19, Jan.-Feb. edition, 1963. As described in that application and as is used herein, the term "frost" generally describes a random minute wrinkling produced on a heat-deformable insulating thermoplastic layer. Frosting need not be uniform across the exposed surface of a heat-deformable thermoplastic layer but can be in imagewise configuration thus giving rise to a method of recording patterns of light and shadow.

A further method of recording information on a heat-deformable thermoplastic layer is disclosed by Ciccarelli et al. Serial No. 388,322 filed Aug. 7, 1964, now abandoned, and assigned to the assignee of the present invention, and Nicoll, "A New Surface Phenomenon in Thermoplastic Layers and Its Use in Recording Information" RCA Review, pp. 209–231, June 1964 wherein it is shown that deformation imaging can be triggered by minute quantities of impurities on the thermoplastic surface. Apparently, the surface impurities act as nucleating centers which, in some manner, modify the surface tension of the thermoplastic heat-deformable layer whereby during heat-development frosting will occur only in those areas where an impurity layer of proper thickness is present on the surface.

OBJECTS OF THE INVENTION

It is an object of the present invention to provide a novel method for recording information.

It is an object of the present invention to provide a method for recording information on a photoconductive heat-deformable thermoplastic layer.

It is a further object of the present invention to provide a method for recording information on a photoconductive heat-deformable thermoplastic layer wherein minute quantities of imaging-forming impurities are deposited upon a surface thereof.

A still further object of the present invention is to provide a novel system for recording information by depositing minute quantities of imaging impurities upon a photoconductive heat-deformable thermoplastic layer.

The above and still further objects, features, and advantages of the present invention will become apparent upon consideration of the following detailed disclosure of specific exemplary embodiments of the present invention.

SUMMARY OF THE INVENTION

The above and still further objects of the present invention are achieved by contacting a photoconductive heat-deformable thermoplastic layer in series with an electrolyte containing an electrolytically reducible material, exposing the photoconductive thermoplastic layer to sensitizing radiation whereby current passes through portions of the photoconductive thermoplastic layer thereby causing the deposition of minute quantities of the electrolytically reducible material on the portions of the layer adjacent the electrolyte, and thereafter uniformly charging the surface of the photoconductive thermoplastic layer having the imaging material thereon and softening the layer until it deforms in imagewise configuration. Until exposure the photoconductive thermoplastic layer acts as a barrier preventing the passage of current therethrough thereby disrupting the circuit and preventing deposition of the electrolytically reducible material. During exposure, the exposed portions of the surface of the photoconductive thermoplastic layer act as a cathode upon which minute quantities of the electrolytically reducible material are deposited. Thereafter, the photoconductive thermoplastic layer is removed from the imaging system, and the surface having the minute quantities of imaging material thereon is uniformly charged. Upon softening, the layer deforms in imagewise configuration according to the pattern of minute quantities of imaging material deposited in response to the sensitizing radiation.

BRIEF DESCRIPTION OF THE DRAWINGS

The nature of the invention will more easily be understood when it is considered in conjunction with the accompanying drawings wherein.

It should be understood that in all of the figures the thickness of the layers, electrodes, etc. have been greatly exaggerated to show the details of construction.

Figure 1:
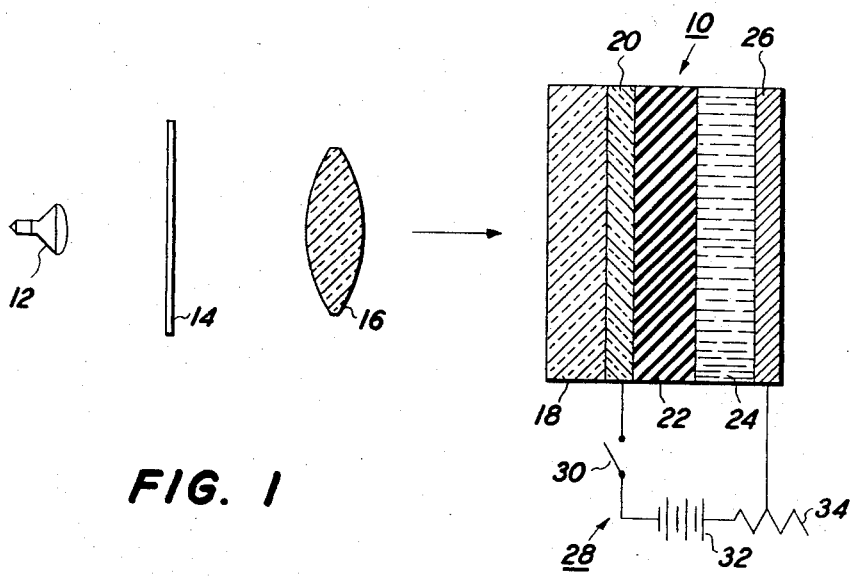
FIG. 1 is a schematic representation of an exemplary imaging system of the present invention.

Referring to FIG. 1, there is seen an imaging system having a latent image producing unit 10 upon which light from light source 12 falls after passing through transparency 14 and lens or lens system 16. Latent image forming unit 10 comprises a transparent supporting substrate 18 having a transparent conductive layer 20 thereon. Disposed on the exposed surface of conductive layer 20 is a photoconductive heat-deformable thermoplastic layer 22. Sandwiched between layer 22 and metal electrode 26 is an electrolyte 24 containing an electrolytically reducible material. Conductive layer 20 is connected in series to electrode 26 through an external circuit 28 having a switch 30, a source of current 32 and variable resistance means 34. Closing switch 30 and exposing photoconductive layer 22 to imaging radiation from source 12 to which layer 22 is responsive completes the circuit and will cause electrolytic deposition of minute quantities of imaging material from electrolyte 24 onto the light exposed portions of photoconductive layer 22. Latent image carrying photoconductive layer 22 can then be removed from unit 10 and developed immediately, as will be described hereinafter, or stored, in an appropriate environment, for development at a later date.

Figure 2:
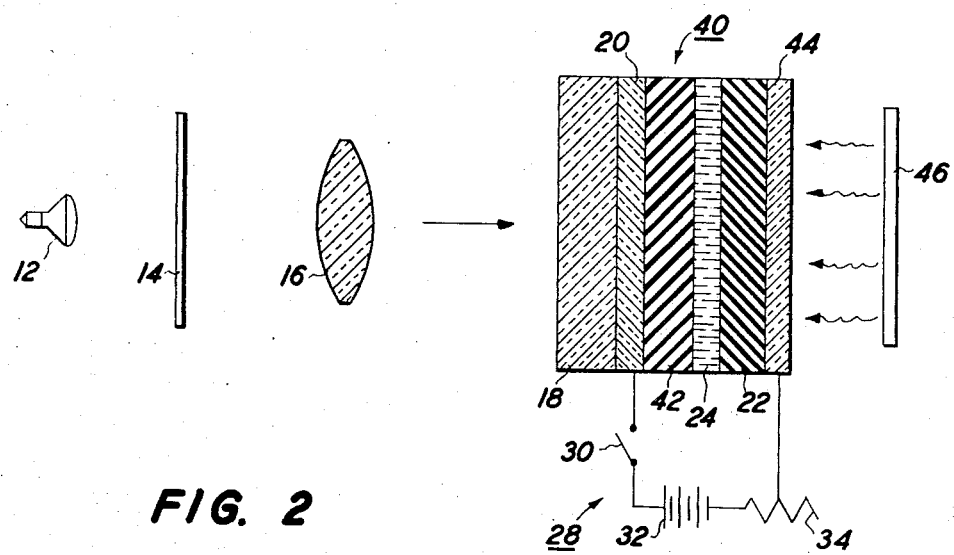
FIG. 2 is an alternate embodiment of the imaging system of FIG. 1.

An alternate embodiment of the imaging system of FIG. 1 is shown in FIG. 2 wherein imaging light from light source 12 falls upon latent image producing unit 40 after passing through transparency 14 and lens or lens system 16. Latent image producing unit 40 comprises a transparent supporting substrate 18 having a transparent conductive layer 20 thereon. Overlying conductive layer 20 is a photoconductive layer 42 which is adjacent electrolyte 24. On the opposite side of electrolyte 24 from photoconductive layer 42 is a photoconductive heat-deformable thermoplastic layer 22 having a transparent conductive layer 44 coated thereon. As in FIG. 1, the conductive layers are connected in series through an external circuit 28 having a switch 30, a source of current 32 and variable resistance means 34. To prevent blocking of the current flow by charging up of thermoplastic layer 22, this material should be slightly conductive or, as shown in FIG. 2, the layer is rendered temporarily conducting during the electrolytic deposition by uniformly exposing the photoconductive thermoplastic layer to sensitizing radiation from source 46. Minute quantities of electrolytically reducible material will deposit from electrolyte 24 onto the adjacent surface of thermoplastic layer 22 corresponding to the input radiation passing through transparency 14 from light source 12. The latent image carrying thermoplastic layer 22 can then be removed from unit 40 and developed or stored, as previously indicated, until subsequent development.

Supporting substrates 18, as shown in FIGS. 1 and 2, should be transparent to the input imaging radiation and can be, for example, optically transparent glass. Adjacent the transparent substrate is a transparent conductive coating which can be, for example, a thin layer of tin oxide. This oxide coated glass is commercially available under the trademark NESA glass from the Pittsburgh Plate Glass Company of Pittsburgh, Pa. Conductive layer 44 should also be transparent and, therefore, can be constructed from the NESA glass with a transparent supporting substrate, if desired. By transparent it is meant that the material will transmit at least the portions of the electromagnetic spectrum to which the photoconductive layers are responsive. It is not necessary that the materials transmit those portions to which the photoconductive layers are non-responsive.

The imaging layer of the present invention comprises a thin layer of photoconductive thermoplastic material which is normally solid and electrically insulating but which can be temporarily softened by the application of heat. The deformable layer may comprise, for example, almost any electrically insulating thermoplastic resin capable of being softened at a moderate temperature and retaining an electrostatic charge at such a temperature. The invention can also be carried out with materials which are viscous at room temperature but can be solidified by cooling when required and can also be carried out with materials that harden or polymerize by heating. Suitable materials include polystyrenes, polyvinyl chlorides, terpene resins, rosin ester resins, etc.; a more complete listing is given in Gunther et al. U.S. 3,196,001 and reference should be made thereto for that complete listing.

Besides having the aforementioned physical characteristics as well as having the property of frosting in response to minute quantities of imaging impurities coated on its surface, the thermoplastic deformable layer is rendered photoconductive by incorporation therein of sufficient quantities of photoconductive materials. Any suitable photoconductor may be used. Typical photoconductors are inorganic photoconductors, such as zinc oxide, cadmium sulfide, mercuric sulfide, cadmium selenide, zinc sulfide, selenium, antimony sulfide, mercuric oxide, arsenic sulfide, gallium triselenide, etc. and organic photoconductors, such as substituted and unsubstituted phthalocyanine, quinacridones, algol yellow (CI No. 67,300), etc. Others include the more soluble organic photoconductors, such as 4,5 - diphenylimidazolidinone, 4,5 - diphenylimidazolidinethione, 4,5-bis - (4' - amino-phenyl)-imidazolidinone, 1,5 di-cyanonaphthalene, 1,4 - dicyanonaphthalene, aminophthalodinitrile, nitrophthalidinitrile, etc. unmodified or complexed with small amounts (up to about 5%) of suitable Lewis acids. In addition, other photoconductors may be formed by complexing one or more suitable Lewis acids with the thermoplastic layer to form a material which is normally not thought of as a photoconductor. In general, any suitable photoresponsive material may be employed with the choice depending largely upon the photosensitivity required, the spectral response, etc. The art is replete with suitable materials which can be incorporated in the imaging layer of the present invention and it is not deemed necessary to provide a complete listing of suitable material as reference may be made thereto.

Any suitable electrolyte having an electrolytically reducible material therein which is capable of frosting the heat-deformable thermoplastic layer can be used to deposit the minute quantities of imaging material upon that layer. Either a wet or dry electrolyte can be used. Electrolytes containing electrolytically reducible material include, for example aqueous solutions of metallic salts, such as aluminum salts, copper salts, gold salts, nickel salts, silver salts, zinc salts, etc, and dry electrolytes wherein the reducible material is dispersed throughout a binder material from which the minute quantities of imaging materials can be withdrawn in response to current flow created by input radiation. Various modifying agents can be added to the electrolyte to ensure that it will have the proper physical characteristics. Such additives, as well as the electrolytes to which they may be added, are well known in the art and need not be considered specifically at this point. Reference may be had to the prior art for specific formulations suitable for deposition in the electrolytic mode.

Any suitable photoconductor can be utilized as photoconductive layer 42 shown in FIG. 2, provided it is not physically or chemically acted upon by the adjacent electrolyte layer 24. The electrolyte-photoconductor combination should be chosen with this in mind; that is, the electrolyte should not degrade the photoconductivity of the photoconductive layer nor over long periods of use should it destroy other physical properties which, of necessity, should be maintained in this reuseable imaging system. Well known photoconductive materials include zinc oxide, cadmium sulfide, cadmium selenide, selenium, etc., and two-phase materials wherein photoconductive particles are dispersed throughout an insulating binder, such as the photoconductive materials shown in Middleton et al. U.S. 3,121,006 and Corrsin U.S. 3,151,982. The two-phase photoconductors are particularly suitable because different insulating binders can be chosen, within limits, to provide the necessary resistance to possible physical and chemical degradation of the photoconductive layer by particular electrolytes.

Since it is only necessary to deposit a very thin and invisible layer of imaging material, the electrolyte layer can be extremely thin and will not, therefore, adversely affect the resolution capabilities of the imaging system when used in the manner as shown in FIG. 2. The electrolyte need only be deposited upon one of the appropriate surfaces and then sandwiched between the photoconductive thermoplastic layer and the transparent conductive layer 20, as shown in FIG. 1, or the photoconductive layer 42, as shown in FIG. 2. The conductive layer adjacent the thermoplastic heat-deformable layer is connected to the negative terminal of a potential source so that the thermoplastic layer will correspond to the cathode in the electrolytic imaging system. Under suitable potential and in response to sensitizing input radiation, as shown in FIG. 1, or sensitizing input radiation and uniform sensitizing illumination, as shown in FIG. 2, minute quantities of imaging material deposit upon the thermoplastic heat-deformable layer in a pattern corresponding to the input radiation of light and shadow. Since much less than a monolayer of deposited material is required to nucleate the frost formation, the sensitivity of this system is high, image amplication is significant and there is provided a high speed method for recording information suitable for reconnaissance or space camera applications. After exposure, the latent image carrying thermoplastic layer can be easily stored without fear of destruction. Since it is radiation insensitive after removal the imaging system, light-tight containers need not be provided for storage.

To develop the latent image carrying thermoplastic layer into a viewable or readable form, the surface of the thermoplastic layer carrying the minute quantities of imaging material is uniformly charged, as with a corona charging device, and then heated to reduce the viscosity of the thermoplastic layer whereby frosting can occur in accordance with the pattern of impurities deposited thereon. Any suitable heating method can be used during development, including infra-red radiation, induction heating of support layer and convection heating with suitable heated fluids. As the material is softened the surface of the layer develops a microscopically uneven surface which has been defined as frosting. Areas of frosting can easily be distinguished, with the naked eye, from areas which have not been frosted.

It is known that other methods of softening a deformable thermoplastic layer can be utilized to frost the layer in imagewise configuration. One such method includes treating the thermoplastic layer with solvent vapor until it deforms. This development technique can be utilized here provided the solvent will not wash away the deposited layer or the reaction product of the deposited layer and the underlying thermoplastic surface, in the event that the deposited layer chemically reacts with the surface to form a further material which acts as the nucleating center in the frost formation. Additionally, the solvent should not otherwise affect the adhesive forces existing between the deposited material and the underlying thermoplastic layer. Such modifications of the deposited material could undesirably destroy the image or image resolution. With these requirements in mind, solvent vapor treatment is a feasible, through not preferred, method of deforming the thermoplastic layer in accordance with the pattern of deposited imaging material.

The herein disclosed electroyltic deposition technique can also be used to render non-frostable portions of a photoconductive deformable thermoplastic layer which has been uniformly coated within thin imaging material layer of slightly less than about 0.3 micron which will cause frosting upon suitable development. Deposition of small amounts of reducible material in a pattern corresponding to the input radiation impinging upon the imaging member will cause those areas to be rendered non-frostable if the total thickness of the deposit exceeds a maximum value of about 0.3 micron. Areas which have no additional deposits thereon will not exceed this maximum thickness value and, therefore, will selectively frost during development.

The mechanism by which this type of frosting proceeds is not, as yet, clearly understood. It is not clear whether the deposited material induces a chemical reaction with the surface skin of the thermoplastic layer or remains non-reactive. In either event, experimentation with the particular materials chosen for the various layers will determine how the particular system is to be operated. Thus, if it is determined that a chemical reaction is taking place between the deposited material and the surface of the thermoplastic layer, then it may be desirable to make the photoconductive thermoplastic layer the anode rather than the cathode in the electroyltic cell. Other modifications will be apparent to those skilled in this art.

The frosted image produced by the aforegoing procedure can be examined simply by looking at the thermoplastic layer, and can also be efficientially utilized in a projection system wherein a converging beam of light is directed onto the frosted thermoplastic layer which in turn specularly reflects this light through a projection lens onto a projection screen. The frosted areas scatter light rather than specularly reflecting it and this scattered light is not imaged on the projection screen by the projection lens. If desired, a shield may be provided surrounding the projection lens to prevent scattered light from reaching the projection screen. A schlieren optical system may also be employed. The frosted images of the present invention, however, produce gross scattering or deflection of light and, therefore, do not require the use of a relatively sensitive, complex and expensive schlieren optical system. If the thermoplastic layer and the supports, if any, are transparent the frosted image can also be viewed by transmitted light techniques, including the use of conventional slide projectors or the like.

While the invention has been described with reference to preferred embodiments thereof, it will be understood by those skilled in the art that various changes in the form and details may be made without departing from the true spirit and scope of the invention. Provided the advantageous results of this invention are not adversely effected, such changes are considered to be within the scope of the present invention as defined by the appended claims.

What is claimed is:

1. A method of making a frosted image of a light image comprising:
    (a) providing a layer of photoconductive thermoplastic material capable of being deformed by frosting and an electrolyte having electrolytically reducible material, the electrolytically reducible material being different from the photoconductive thermoplastic material,
    (b) forming a layer of the electrolytically reducible material on the layer of photoconductive thermoplastic material by coupling the layer of photoconductive thermoplastic material to the electrolyte and exposing the layer of photoconductive thermoplastic material to the light image, the layer of electrolytically reducible material so formed varying in thickness according to the variations in the intensity of the light image,
    (c) allowing the thickness of the layer of electrolytically reducible material to reach a maximum of no more than about 0.3 micron, and
    (d) frost developing the layer of photoconductive thermoplastic material,
    (e) whereby the layer of electrolytically reducible material will induce deformations of the layer of photoconductive thermoplastic material so as to cause the formation of a frosted image corresponding to the light image.

2. The method of claim 1 and wherein frost developing the layer of photoconductive thermoplastic material comprises:
    (a) applying a uniform charge to the surface of the layer of photoconductive thermoplastic material containing the electrolytically reducible material, and then
    (b) softening the layer of photoconductive thermoplastic material to a degree sufficient to cause frost deformation.

3. The method of claim 2 and wherein softening the layer of photoconductive thermoplastic material comprises heating the layer of photoconductive thermoplastic material to a temperature sufficient to cause softening.

References Cited

UNITED STATES PATENTS

| | | | |
|---|---|---|---|
| 3,010,883 | 11/1961 | Johnson et al. | 204—18 |
| 3,322,537 | 5/1967 | Ciaimo | 96—1.1 |
| 3,404,033 | 10/1968 | Laendle | 117—217 |

GEORGE F. LESMES, Primary Examiner

M. B. WITTENBERG, Assistant Examiner

U.S. Cl. X.R.

96—1.5; 117—217; 204—18